Feb. 16, 1943.  R. F. BARDWELL ET AL  2,310,925
PROCESS OF MAKING LENSES
Filed Oct. 11, 1939  4 Sheets-Sheet 1
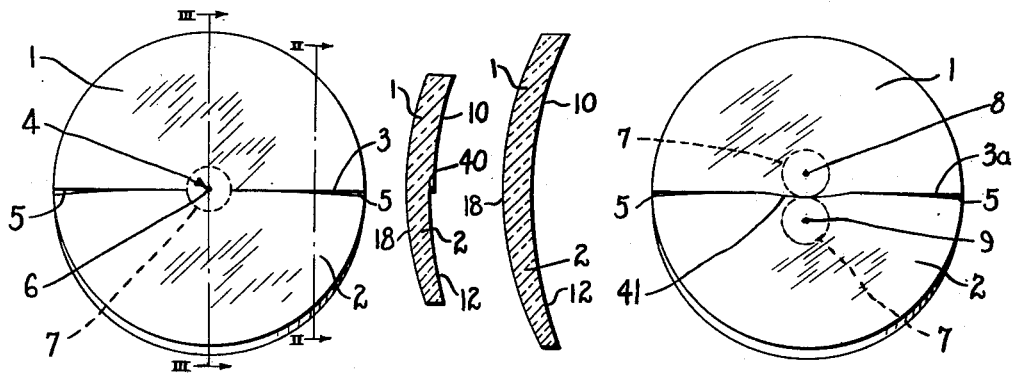
Fig. I  Fig. II  Fig. III  Fig. IV
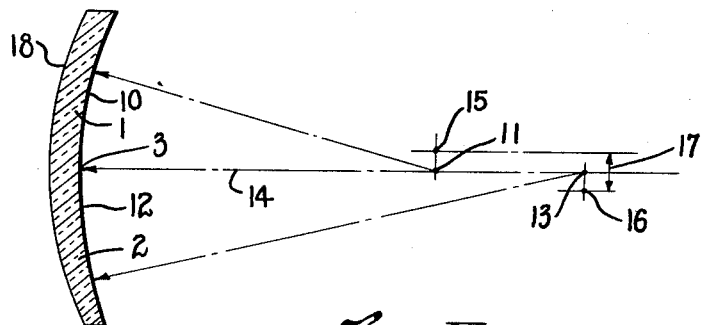
Fig. V
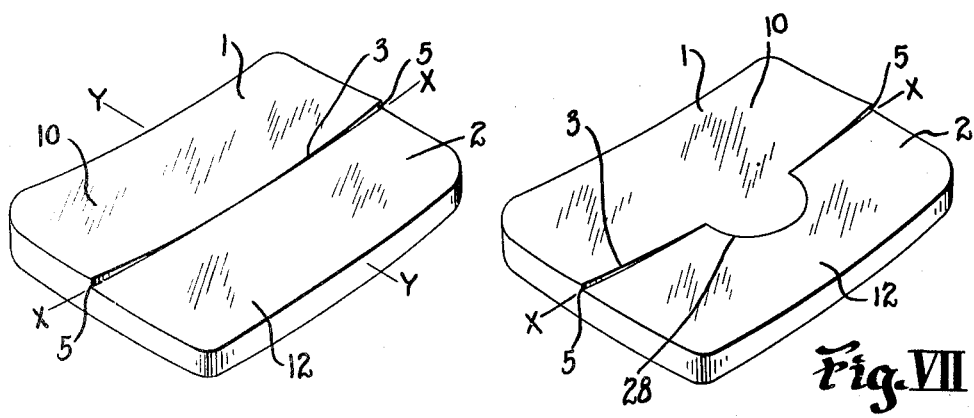
Fig. VI  Fig. VII
INVENTOR.
RALPH F. BARDWELL
JOHN H. SMITH
BY Harry H. Styll.
ATTORNEY.

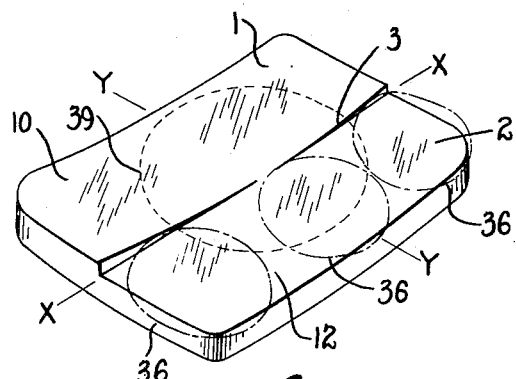
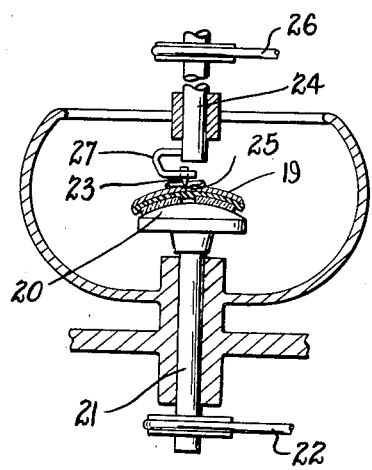
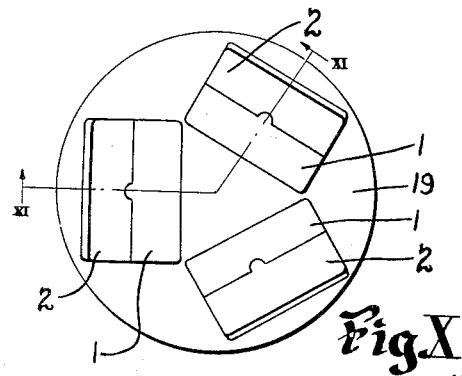
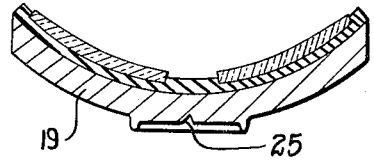
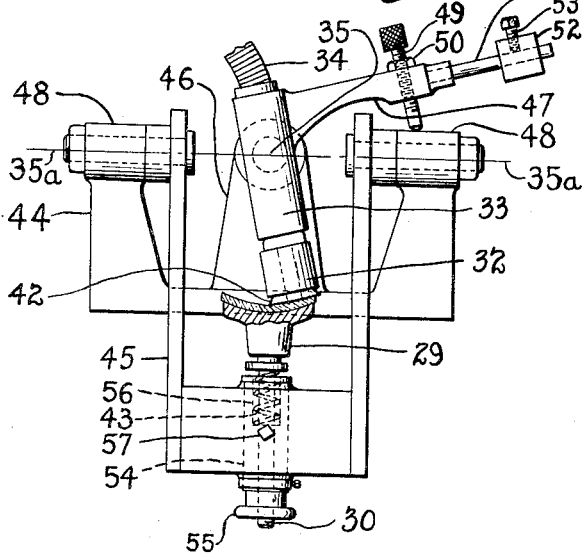
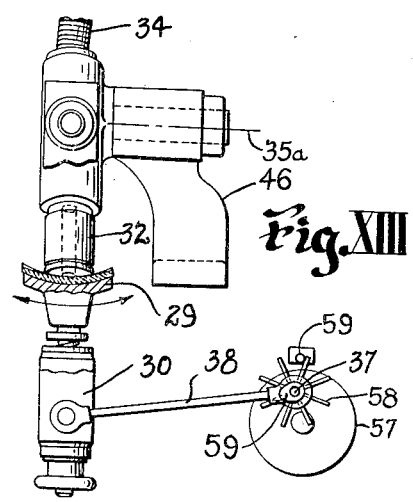

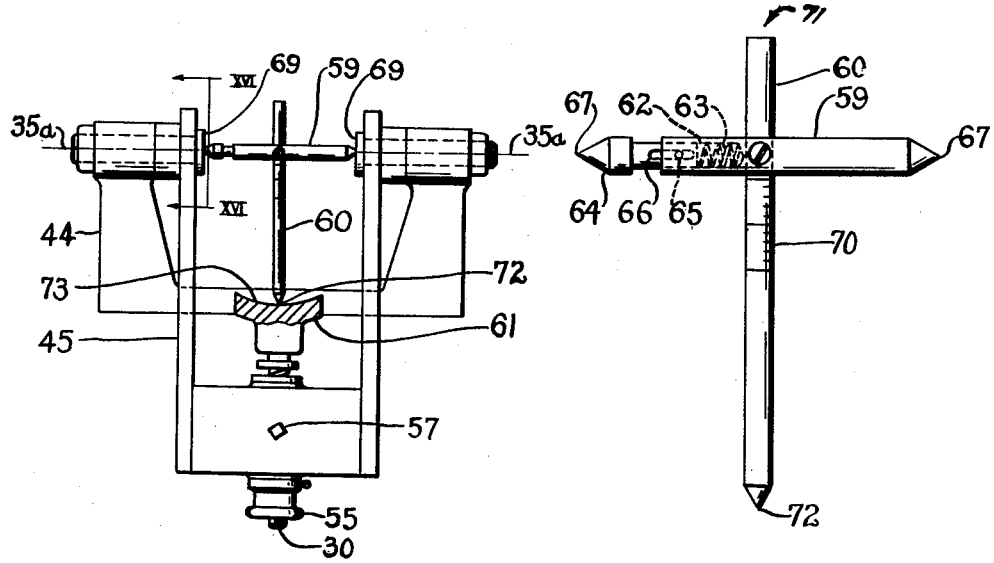
Fig. XIV   Fig. XV
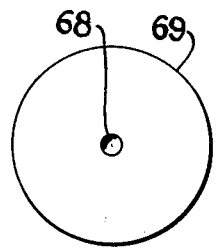
Fig. XVI
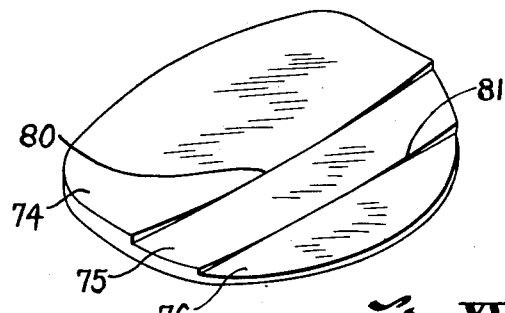
Fig. XVII
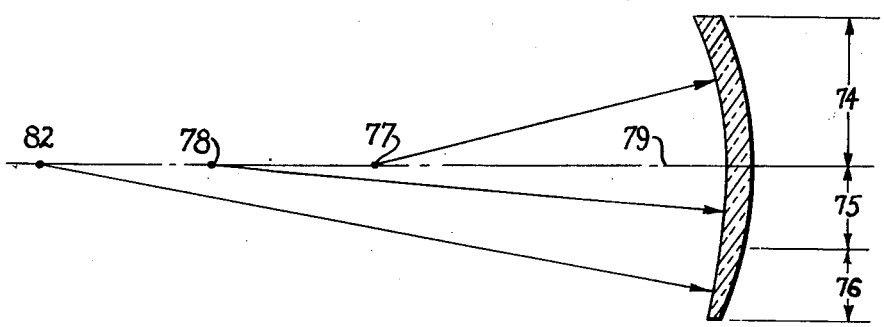
Fig. XVIII
INVENTOR.
RALPH F. BARDWELL
JOHN H. SMITH
BY Harry H. Styll
ATTORNEY.

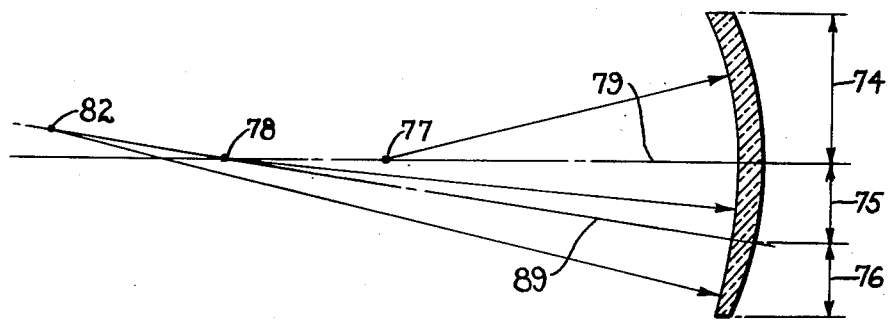
Fig. XIX
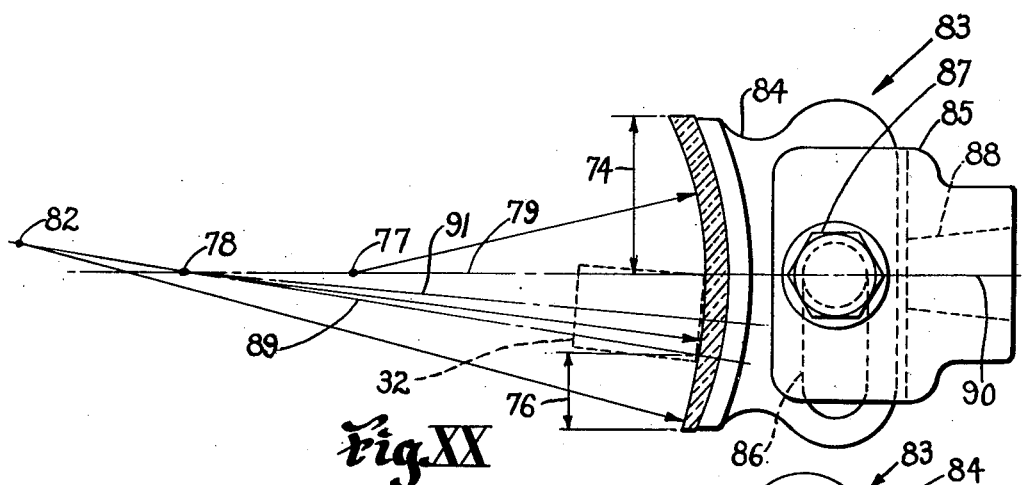
Fig. XX
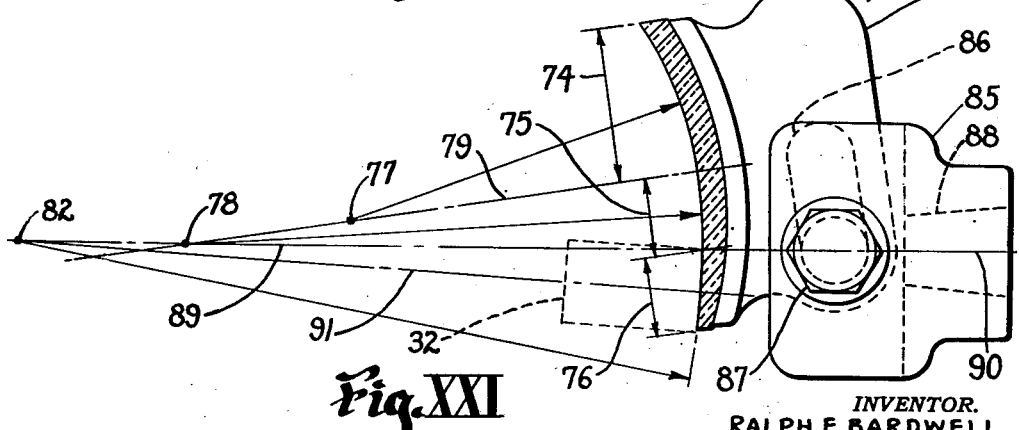
Fig. XXI
INVENTOR.
RALPH F. BARDWELL
JOHN H. SMITH
BY Harry H. Still
ATTORNEY.

Patented Feb. 16, 1943

2,310,925

UNITED STATES PATENT OFFICE 2,310,925

PROCESS OF MAKING LENSES

Ralph F. Bardwell, Southbridge, and John H. Smith, Sturbridge, Mass., assignors to American Optical Company, Southbridge, Mass., a voluntary association of Massachusetts Application October 11, 1939, Serial No. 299,006

7 Claims. (Cl. 51—284)

This invention relates to improvements in multifocal or bifocal lenses and to new and improved processes of making the same. The principal object of this invention is to provide an improved one-piece multifocal lens with wide or broad focal fields and with the optical center of each field in a controlled position, and means and method of making same.

Another object of the invention is to provide a lens of this character of one piece of lens medium having wide or broad focal fields with the optical centers of the different fields calculatedly positioned relative to each other to prevent jump or displacement, when desired in going from one field to the other and to give the desired relationship of said centers.

Aother object of the invention is to provide new and improved processes for making such lenses in a more economical way and thus reducing the cost of production thereof and the cost to the consumer.

Another object of the invention is to provide new and improved processes of making lenses wherein some at least of the lens surfaces may be produced on several lens blanks at once, instead of each surface of each blank being generated separately as has been the past practice in the art.

Another of the objects of the invention is to provide new and improved processes of making such lenses wherein certain of the operations may be economically performed by molding instead of the more expensive grinding and polishing operations as is the present practice in the art.

Another object is to provide means for forming, on a single lens of the character described, a plurality of surfaces without reblocking the lens.

Another object is to provide a one piece trifocal lens of the character described in which one surface is monaxial with each of two surfaces which are not monaxial with each other.

Another object is to provide a onepiece trifocal of the character described in which two of the surfaces are monaxial and two of the surfaces may be formed without reblocking.

Another object is to provide a onepiece trifocal of the character described, in which one surface is monaxial with each of two surfaces which are not monaxial with each other and two of the surfaces may be formed without reblocking.

Another object is to provide a onepiece multifocal lens in which the field dividing cliff edge may be formed at any desired angle with the adjacent lens surfaces.

Another object is to provide a onepiece multifocal lens of the character described in which the optical centers of each field may be positioned in any desired position independently of the other fields.

Other objects and advantages of the invention will become apparent from the following description taken in conjunction with the accompanying drawings. It is apparent that many changes in the details of construction, arrangement of parts and the steps in the processes may be made without departing from the invention as expressed in the accompanying claims. The invention, hence, should not be limited to the exact matters shown and described as the preferred matters have been shown and described by way of illustration only.

Referring to the drawings:

Fig. I is a front view of a lens of the invention;

Fig. II is a cross section on line II—II of Fig. I;

Fig. III is a cross section taken on line III—III of Fig. I;

Fig. IV is a front view of a lens of the invention showing the optical centers of its two fields separated;

Fig. V is a diagrammatic cross section of a lens of the invention similar to Fig. III and showing the centering of its fields;

Fig. VI is a perspective view of a molded blank for making the lens of the invention;

Fig. VII is a perspective view of the blank illustrating the completion of the distance field;

Fig. VIII is a perspective view of the blank illustrating the completion of the reading field;

Fig. IX is a partial cross section of a grinding and polishing machine on which the distance field of the lens is ground and polished;

Fig. X is a plan view of a lens holder for holding the blanks when the distance field is generated;

Fig. XI is a cross section taken on line XI—XI of Fig. X;

Fig. XII is a partial elevation of a lens grinding machine on which the reading field is generated;

Fig. XIII is a partial side elevation of Fig. XII;

Fig. XIV is a view similar to that of Fig. XII, illustrating the positioning and operation of the gauge for setting the machine to the desired cutting radius;

Fig. XV is an enlarged view of portions of the radius gauge;

Fig. XVI is a partial view taken on line XVI—XVI of Fig. XIV with the gauge removed and looking in the direction of the arrows;

Fig. XVII is a perspective view of an alternate structure of the lens of the invention;

Fig. XVIII is a central sectional view of the lens of Fig. XVII, showing one arrangement for centering of its fields;

Fig. XIX is a view similar to Fig. XVIII, showing another arrangement of the centering of the fields;

Fig. XX is a view of a lens holder used in the forming of a lens of the type shown in Fig. XVII; and Fig. XXI is a view similar to Fig. XX, with the holder in position for grinding a different field.

Lenses of one piece of lens material having two or more focal fields ground and polished thereon are very important in the art. The optical crown glass of which they are made is very stable and the best lens medium known for lenses generally. The glass is stable, it does not corrode, and there is an absence of chemical changes, dispersion and color troubles, and difficulties of expansion, such as are present in lenses made of two or more pieces of different glasses. Such lenses however have been difficult and expensive to grind, and the proper relationship of the optical centers of the various fields has been particularly difficult and expensive to obtain. Due to these difficulties and the expense involved fused lenses wherein two or more pieces of different glasses are fused together have come into vogue. These lenses are subject to chemical change and tarnish, there are color troubles due to differences in dispersion and the lenses are liable to crack or separate because of the difference of expansion of the separate parts. It is therefore one of the prime objects of our invention to provide a one-piece lense of multiple fields having desired broad focal fields, and proper relationship of the optical centers that can be more economically produced than present day onepiece multifocal lenses.

Referring to the drawings wherein similar reference characters represent similar parts throughout:

A lens of our invention is shown in Fig. I. The upper or distance field is shown at 1, the lower or reading field is shown at 2. The two fields are separated by the straight division line 3. The fields 1 and 2 merge together substantially without shoulder adjacent the center of the lens at 4, thus causing the line 3 to substantially disappear adjacent said center. There is a shoulder 5 between the two fields increasing in depth towards the outer edges. It will be noted that the reading field 2 is a wide field extending entirely across the lens. The optical center 6 is the optical center of both field 1 and field 2. The dotted line 7 indicates the pupil of the eye. In Fig. IV the optical center 8 of the distance field 1, and the optical center 9 of the reading field 2 are shown separated by an amount substantially equal to half the diameter of the pupil of the eye above and below the line 3a which, due to the separation of the optical centers, is a continuous line, less visible adjacent the center and having a dip 41 which varies in extent according to the curvatures of surfaces 1 and 2. The pupil of the eye is indicated by the dotted lines 7. The advantage of this centering is that as soon as the eye is clear of the dividing line 3a in either direction it is centered over the optical center of that particular field. The optical center is the point of best vision in any lens.

In Fig. V is shown the centering of the surfaces. The surface 10 of the field 1 is centered at 11, the surface 12 of the field 2 at 13. The centers 11 and 13 are on the line 14, passing through the line of division 3 of the two fields for the centering shown in Fig. I. To obtain the centering shown in Fig. IV, the center 11 is moved up to the point 15, and the center 13 moved down to the point 16. The distance between centers is indicated at 17. This distance may be varied as desired within practicable limits.

The lens is completed by putting on the prescription surface 18 on the side opposite the surfaces 10 and 12. This surface 18 is centered as required to give the required powers in the fields 1 and 2, and preferably ground and polished. The surface 18 is placed at a position to give the required thickness of lens. The surfaces 10, 12 and 18 are all good optical surfaces. The surface 18 may be put on at any desired angular relation to the surfaces 10 and 12.

The finished lens is characterized by wide focal fields extending entirely across the lens and optical centers placed in controlled relation with each other, thus producing a lens of fine optical qualities.

To produce our lens we proceed as follows:

We mold a lens blank of optical crown glass or other desired lens medium to the shape substantially as shown in Fig. VI. This blank has the field 1, the field 2, the division line 3 between the fields, and the shoulders 5. It should be noted that the ridge producing the division line 3 is not absolutely essential. The purpose of this ridge is to decrease subsequent and/or unnecessary grinding. The blank is of thickness sufficient for the production of a finished lens therefrom. The curvatures of the surfaces 1 and 2 are approximately those of the finished surfaces to be ground and polished thereon.

We next mount a plurality of these lens blanks, all of substantially the same curvature and thickness on a lens holder 19, see Figs. X and XI, the blanks being held in place thereon by the ordinary pitch blocking or other suitable means.

In Fig. X, three such blanks are shown mounted on the holder 19. The number of blanks that can be mounted on the holder depends upon the size of the holder and the grinding lap to be used, the flatter the curvature of the surfaces to be ground, the more blanks can be accommodated.

When the blanks have been mounted on the holder 19 we place the holder in place on the grinding lap 20 of the grinding machine shown in Fig. IX. The lap 20 is rotated by the shaft 21, and belt 22. The crank pin 23 of the upper spindle 24 of the machine is placed in the recess 25 of the holder 19. The spindle 24 is rotated by the belt 26. The holder 19 travels over the lap 20, being carried around by the crank 27, causing a break up motion on the grinding surface to prevent concentric rings and scratches and insuring a smooth surface being generated.

We grind and polish the surface of the field 1 in this manner. It will be noted that in this way we are able to work on a plurality of lenses at the same time and to use standard methods of grinding and polishing. This results in great economy.

When the surface of field 1 is thus ground down it will extend somewhat into the surface of field 2 as indicated by arcuate line 28 in Fig. VII.

We then remove the blanks from the holder 19 and mount the blanks singly on a holder 29, see Figs. XII and XIII. This holder 29 is mounted on the shaft 30 which is preferably not rotatable. We then position a ring grinding tool 32 in desired angular relation to produce the required surface on field 2. In order to produce or maintain a cliff-like edge along the line 3 at the desired angle relative to the adjacent surfaces of the lens, the edge of the tool 32 is beveled, as shown at 42 in Fig. XII. This beveling makes it possible to tilt the tool sideways to bring its edge 42 to any desired point on the lens. It will be readily understood that, if an exact right angled cliff edge is desired, the angle of the bevel necessary at different tilted positions will vary. However, since the angle of the cliff edge may readily be conceived to be more effective at other than a right angle to achieve certain results such as diminishing of reflections, it has been found, that for practical purposes, one angle of the tool edge will produce, at different tilted positions, practical cliff angles within a considerable range, with the departure from right angularity being substantially negligible. It is to be understood, also that greater departures from right angularity of the cliff edge may be accomplished, when desired, by properly angling the tool edge, while taking into consideration the amount of tilting of the tool. The tool 32 is carried by the spindle 33, rotated by the flexible shaft 34. The spindle is pivotably movable about the axis 35. The holder 29 is oscillated back and forth about the axis 35a in such a way as to carry the ring tool over the surface of field 2 in a direction substantially parallel with the line 3, see Fig. VIII. The dotted lines 36 indicate the outline of the tool 32.

The grinding and polishing operations are done on the surface of field 2 in this way using the machine of Figs. XII and XIII. This machine includes a yoke-like support member 44 having swingable U shaped lens holder support 45 pivoted thereon to swing about the axis 35a. An upright support member 46 is positioned substantially centrally of the yoke-like member 44 along the axis 35a, and to one side thereof, and carries the spindle 33 for pivotal movement about the axis 35, which is substantially perpendicular to the axis 35a. The spindle 33 has a side arm 47 integral therewith and extending over a bearing 48 of the yoke 44. The side arm 47 has a set screw 49 extending therethrough and resting on the bearing 48 in adjusted position held by the nut 50. On the outer end of the arm 47 is a shaft 51 on which is mounted a slidable weight 52, held in adjusted position by a screw 53.

The support 45 carries a shaft 30 in a bushing 54. The shaft 30 carries the lens holder 29 on its upper end and has a handle 55 for adjusting it longitudinally to move the lens holder 29 towards and away from the tool 32. The bushing 54 has a recess 56 therein containing the spring 43, which urges the shaft 30 and therefor the lens holder 29 towards the tool 32. The screw 57 may be loosened to allow the shaft 30 to be rotated so as to position the line 3 on the lens in desired relation with the tool edge and in substantial parallelism with the axis 35.

The support 45 is oscillated about the axis 35a by means of a connecting rod 38, which is pivotally attached to the support 45, preferably centrally thereof as indicated in Fig. XIII so as to provide substantially equal thrust on the bearings 48. The other end of the connecting rod 38 is eccentrically mounted at 37 on the wheel 57 to provide the back and forth drive of the support 45 about the axis 35a. In order to prevent line scratching in the work during abrading, it is necessary to provide a break up motion when grinding lenses. The break up motion in this instance is accomplished by a Geneva type pickup mounted on the pivot 37, having pickup spokes 58 for engagement with a stationary pin 59a so that the swing of the support 45 about the axis 35a is varied in length at each revolution of the wheel 57, due to the movement of the cam 59 which is moved to a different position each time one of the spokes 58 is moved by the tripping action against the pin 59a.

It will thus be seen that the lens holder 29 is oscillated by the eccentric crank 37 and connecting rod 38 mechanism, and is rotatably adjustable to align the cliff edge in right angled relation with the trunnion axis 35a, as well as being longitudinally adjustable and resiliently held against the lens by spring 43.

It will be noted that when the surface of the field 2 has been completed the line 28, Fig. VII, has substantially disappeared, and that the surfaces of field 1 and 2 have merged on the line 3 adjacent the center and have the shoulder 5 between them towards the outer edges. It is to be understood that the axes 35, 35a, and the longitudinal axis of the tool, preferably meet at a common point.

In Figures XIV, XV and XVI is illustrated a gauge and its operation in setting the lens holder 29 of Fig. XII to the proper height. The gauge 71 consists of a horizontal bar 59 and a vertical bar 60 adjustable transversely thereof. These cross bars, in combination with a test block 61, are used to determine the proper position for the lens holder 29.

The bar 59 has a hollow portion 62 which contains a spring 63. A free end 64 slides in the hollow 62 against the action of the spring 63 so as to be urged outwardly, and is held therein by a pin 65 fixed in the bar 59 and extending into a slot 66 in the free end 64. The points 67 are adapted to engage depressions 68 on the faces 69 of the support 45. These depressions 68 are centered on the axis 35a. There is a scale 70, calibrated to suit the convenience of the operator, on the bar 60. The test block 61 is formed to the curvature to be ground.

The procedure followed in grinding the reading portion of the lens is, then, as follows: The gauge 71 is snapped into position on the support 45, as shown in Fig. XIV, with the bar 60 adjusted to the radius of the curvature to be ground on the lens. A test block 61, having a face formed to the curvature to be ground on the lens is placed in position on the shaft 30 as shown in Fig. XIV. The shaft 30 is then adjusted, by means of the handle 55, until the gauge 71 may be swung across the surface of the test block, or vice versa, with the point 72 barely touching the surface.

The block 61 and the gauge 71 are then removed and the lens holder, with the lens to be ground thereon, is positioned on the shaft 30 as shown in Fig. XII; and the tool 32 brought into contact with the lens to carry out the grinding operation through the motions previously described.

It is to be understood that the spindle 33 may be moved out of the way to make room for the gauge 71 in any desired manner, such as swinging, or complete temporary removal.

The test block 61 is preferably formed to a thickness which will bring its surface 73 to the position with respect to the axis 35a to which it is desired to bring the surface being ground on the lens, when finished. In other words, the test block 61 is so calculated and the height of the shaft 30 so set in accordance therewith, that, when the surface being ground on the lens is finished, if desired, the gauge, still at the same adjustment when used with the test block, may again be snapped into place in the support 45, and the point 72 will have the same relation with the finished lens surface as it previously had with the surface of the test block.

It is to be understood that many other mechanisms could readily be devised for the gauging and grinding of any of the surfaces mentioned herein before or after, and that the structures shown and described are shown for the purposes of illustration as one means and method of accomplishing the desired result.

The tool may, if desired, be positioned with its edge 42 removed from the line 3 of the lens and allowed to feed gradually towards said line 3 as it moves down through the lens. This may be accomplished by setting the screw 49 in the side arm 47 so as to hold the spindle 30 in desired angular position relative to the axis 35a, and setting the weight 52 on the shaft 51 to produce the desired pressure of the tool on the lens either in combination with the pressure already exerted by the spring 43, or by itself. The tool may thus be fed simultaneously into and across the lens, if desired.

It is to be understood that the feeding operations involved in forming the lenses of this invention may, if desired, be performed manually, instead of mechanically by the means shown or other suitable means.

Figures XVII through XXI are illustrative of an alternative lens structure and means and method of making the same. It is to be understood that, although a trifocal lens is shown, lenses having more focal fields may be similarly formed.

In Fig. XVII is shown a blank for a trifocal lens, comparable to the bifocal blank of Fig. VI.

The lens as shown in Fig. XVII and XVIII comprises surfaces 74, 75 and 76, which may be the distance, intermediate and reading portions respectively or in any other desired order. There may be two distance portions, or two reading portions, or any other desired combination.

The lens is made of one piece of glass, thereby eliminating any color which is inherent in a fused trifocal where different indices of glass are used to attain the different powers.

In manufacturing this lens, curve 74 is ground on a multiple lens block similar to that shown in Fig. X. As in the bifocal lens, and with similar apparatus, each lens is then blocked singly and curve 75 is ground. The radius of curvature is gauged as shown in Fig. XIV and the same procedure followed as in the forming of the bifocal lens previously described in this specification. As before, the center of oscillation, that is, the axis 35a is also the center of the curve to be ground. The lens holder is set to a distance from the center of oscillation equal to the radius to be ground, and as the lens is oscillated across the rotating tool, the correct curve is ground thereon. The radii of the surfaces 74 and 75, having their centers at 77 and 78 on the axis 79 passing through their line of joinder 80, will permit the merging, centrally of the line of division 80, of the two surfaces 74 and 75 to make them monaxial, as is the bifocal previously mentioned.

The curve 76 is ground in the same manner as the curve 75 without reblocking the lens. The lens holder is set to the proper angle with respect to and by pivoting about the axis 35 of the machine of Fig. XII, and the oscillation to the proper radius as previously described, and the same procedure is gone through as for curve 75. Curve 76 is ground until it merges with curve 75 centrally of the line of division 81.

Surfaces 75 and 76 will not be monaxial although the two curves do merge as described. This gives a condition known to the art as a "jump" between surfaces 75 and 76. For some purposes this jump is not a sufficiently great disadvantage to make the lens an impractical one, since the lens may be formed inexpensively.

It will readily be seen that, if there is to be no jump, there must be one point at which the radii of the two curvatures lie along the same line, and this line must pass through the line of division of the surfaces. As may be seen in Fig. XVIII, the radius of the surface 76, having its center at 82 on the axis 79 passing through the line of division 80 between the surfaces 74 and 75, has only one position in which it may lie along the same line as the radius of the surface 75 which has its center at 78, and that is along the axis 79. Since this axis does not pass through the line of division 81, the surfaces 75 and 76 may merge, but will not be monaxial.

The final result in forming the lens as illustrated in Figs. XVII and XVIII is a lens of one piece of glass, which, if a trifocal of the usual type is desired, will have three powers controlled in part by the surfaces 74, 75 and 76, which is free from color and all of the focal fields of which extend across the entire width of the lens. Surfaces 74 and 75 will be monaxial or "jump-free." Surfaces 75 and 76 will merge at a point on their line of division 81, preferably centrally thereof but readily at any other point thereon, but will not be monaxial and will have a slight jump which for some purposes is not impractical. Surfaces 74, 75 and 76 will be of different curvatures thereby giving different powers to the three surfaces. These may be any combination of curvatures desired, not necessarily all different.

In Figs. XIX, XX, and XXI is illustrated the forming of a trifocal lens similar to that illustrated in Fig. XVIII, from the same type of blank as shown in Fig. XVII with the difference that this lens is designed to be "jump free" throughout.

It is to be understood that this blank may be formed in a manner similar to that used in the forming of the bifocal blank of Fig. VI.

This lens (of Figs. XIX to XXI) is designed to have three powers, with surfaces 74, 75 and 76 just as in the previously mentioned trifocal, and the same general advantages and alternatives apply, with the addition that surfaces 75 and 76 as well as 74 and 75, are made monaxial.

The same method of manufacturing is used for grinding and polishing surfaces 74 and 75 as is used in the previously mentioned trifocal. Surface 76 is ground and polished by a method and with apparatus which makes it monaxial with surface 75.

This method consists of blocking the lens on a two piece adjustable lens holder 83, see Figs. XX and XXI, the upper part 84 having the lens blocked and being adjustable on the lower part 85 by means of a slot 86 in one of the two parts, and a bolt or pin 87 in the other. In this instance the slot is in the upper part 84 and the pin in the lower 85, but they may be in either. The lower part having the usual taper hub 88 which fits on the shaft 30 of Fig. XII. The surfaces 75 and 76 are made monaxial by adjusting the upper part 84 to offset position as shown in Fig. XXI, when the surface 76 is ground, and by setting the grinding or polishing tool to the proper angle, as was described in connection with the previously mentioned trifocal and bifocal. The slot 86 is designed so that when the pin 87 is at one end thereof, as in Fig. XX, the lens is in proper relation to the tool 32 for the grinding of surface 75, and when the pin is at the other end of the slot the lens is in proper relation to the tool for the grinding of surface 76 so as to make it monaxial with surface 75 and so as to eliminate "jump" between surfaces 75 and 76 as well as 74 and 75.

In order to make the surfaces 75 and 76 monoaxial at the same time that surfaces 74 and 75 are monaxial, the arrangement of centers of curvature of the various surfaces as illustrated in Figs. XIX through XXI is necessary. It will be noted that the centers 77 and 78 both lie on the axis 79 which passes through the line of division between surfaces 74 and 75, and that the centers 78 and 82 both lie on the axis 89 which passes through the line of division between surfaces 75 and 76.

What is done is simply this—when it is desired to form the surface 75, the lens holder is adjusted to bring the axis 79 in alignment with the axis 90 of the lens holder 83 so as to allow the axis 91 of the tool 32 to be aligned at one point with the axes 79 and 90. This makes it possible to form surfaces 74 and 75 monaxial. The lens holder is again adjusted by means of the slot 86 and pin 87 when it is desired to form the surface 76, so as to bring the axis 89 in alignment with the axis 90 of the lens holder 83 so as to allow the axis 91 of the tool 32 to be aligned at one point with the axes 89 and 90. This makes it possible to form surfaces 75 and 76 monaxial. Further surfaces may readily be formed by making possible further adjustments of the lens holder 83.

Having formed one side of the lens, bifocal or trifocal, the prescription surface 18 is next placed on the opposite side of the lens.

This is a surface so formed and so located as to produce the prescription desired in each focal field in combination with the opposing surface. This surface 18 is ground and polished by the ordinary methods of lap grinding.

One form of the finished lens is cut from the blank as indicated by the dotted line 39 in Fig. VIII.

In dispensing these lenses the surfaces 10 and 12 or 74, 75 and 76 may be placed thereon by the manufacturer and the surface 18 by the dispensing prescription grinder. This insures prompt service to the consumer.

Lenses of this character are very desirable in the art. They have wide focal fields which are of importance in many occupational and other uses. The centering may be made and arranged to best advantage when it is desired to avoid displacement or jump in going from field to field and is exceptionally facile in the positioning of these centers thus overcoming a decided drawback in onepiece multifocal lenses up to date. This may be accomplished by tilting either the tool or lens holder. They may be produced with a decided reduction in cost from present day one-piece multifocal lenses. They lend themselves perfectly to the methods of dispensing lenses now in vogue in the art. The prescription surfaces may be applied with equipment and apparatus now in use, hence no investment on the part of the prescription dispenser is required.

In Fig. II the shoulders at the sides of the lens are indicated at 40.

In Fig. V it will be noted that the surface 10 centered at 11 has a shorter radius than the surface 12 centered at 13. This being so, the surface 10 will cut into the surface 12 along the line 28 as the surface 10 is ground. This extension however will be substantially ground away when the surface 12 is ground as the surface 12 is flatter. Flatter surfaces may be ground to merge, at one point at least, with a sharper curved surface.

It is to be understood that the term "multifocal" as used in this specification and accompanying claims is intended to mean lenses having two or more focal fields.

Certain type of curves may bring about a condition in which surfaces merge at a point other than centrally of the line of division between said surfaces, as brought out above. It is to be understood that the merging portion is limited as to its position only by the curvatures of the surfaces involved, and it is to be understood that any of the various types of curvatures usual in the ophthalmic art may be formed on the various surfaces described, such as prismatic or other common surfaces, and that the optical centers of the various fields may be calculated to different positions as desired.

From the foregoing it will be seen that we have provided simple, efficient and particularly economical means for obtaining all the objects and advantages of the invention.

Having described our invention we claim:

1. The process of forming a semi-finished blank for a multifocal lens comprising forming on said blank two adjacent areas having different surface curvatures thereon with one of said surfaces having portions raised above the other and resulting in a cliff-like wall extending transversely of the blank along a substantially straight line, generating an optical surface on said surface lying above the other to a radius of curvature which will control in part the resultant prescriptive power desired through said portion of the completed lens and to such a depth whereby a portion of said optical surface will extend within the area of the lower surface and be bounded by a line of revolution between said lower surface and said optical surface, and generating a separate optical surface on said lower surface to a radius of curvature which will control in part the prescriptive characteristics desired through said portion of the completed lens and simultaneously forming said separate optical surface to such a depth whereby said line of revolution is substantially entirely removed with the result that said two optical surfaces will substantially merge with each other at one point along the line of the cliff-like wall.

2. The process of forming a semi-finished blank for a multifocal lens comprising forming on said blank two adjacent areas having different surface curvatures thereon with one of said surfaces having portions raised above the other and resulting in a cliff-like wall extending transversely of the blank along a substantially straight line, generating an optical surface on said surface lying above the other to a radius of curvature which will control in part the resultant prescriptive power desired through said portion of the completed lens and to such a depth whereby a portion of said optical surface will extend within the area of the lower surface and be bounded by a line of revolution between said lower surface and said optical surface, and generating a separate optical surface on said lower surface to a radius of curvature which will control in part the prescriptive characteristics desired through said portion of the completed lens and simultaneously forming said separate optical surface to such a depth whereby said line of revolution is substantially entirely removed with the result that said two optical surfaces will intersect with each other at one point along the line of the cliff-like wall.

3. The process of forming a semi-finished blank for a multifocal lens comprising forming on said blank two adjacent areas having different surface curvatures thereon with one of said surfaces having portions raised above the other and resulting in a cliff-like wall extending transversely of the blank along a substantially straight line, generating an optical surface on said surface lying above the other to a radius of curvature which will control in part the resultant prescriptive power desired through said portion of the completed lens and to such a depth whereby a portion of said optical surface will extend within the area of the lower surface and be bounded by a line of revolution between said lower surface and said optical surface, and generating a separate optical surface on said lower surface to a radius of curvature which will control in part the prescriptive characteristics desired through said portion of the completed lens and simultaneously forming said separate optical surface to such a depth whereby said line of revolution is substantially entirely removed with the result that said two optical surfaces will be substantially tangent with each other at one point along the line of the cliff-like wall.

4. The process of forming a multifocal lens from a lens blank comprising forming on one side of said blank two adjacent areas having different surface curvatures thereon with one of said surfaces having portions raised above the other and resulting in a cliff-like wall extending transversely of the blank along a substantially straight line, generating an optical surface on said surface lying above the other to a radius of curvature which will control in part the resultant prescriptive power desired through said portion of the completed lens and to such a depth whereby a portion of said optical surface will extend within the area of the lower surface and be bounded by a line of revolution between said lower surface and said optical surface, and generating a separate optical surface on said lower surface to a radius of curvature which will control in part the prescriptive characteristics desired through said portion of the completed lens and simultaneously forming said separate optical surface to such a depth whereby said line of revolution is substantially entirely removed with the result that said two optical surfaces will substantially merge with each other at one point along the line of the cliff-like wall and forming a finished optical surface on the side of the blank opposite said first optical surfaces.

5. The process of forming a multifocal lens comprising forming a finished optical surface on one side of a blank and forming on the opposite side of said blank two adjacent areas having different surface curvatures thereon with one of said surfaces having portions raised above the other and resulting in a cliff-like wall extending transversely of the blank along a substantially straight line, generating an optical surface on said surface lying above the other to a radius of curvature which will control in part the resultant prescriptive power desired through said portion of the completed lens and to such a depth whereby a portion of said optical surface will extend within the area of the lower surface and be bounded by a line of revolution between said lower surface and said optical surface, and generating a separate optical surface on said lower surface to a radius of curvature which will control in part the prescriptive characteristics desired through said portion of the completed lens and simultaneously forming said separate optical surface to such a depth whereby said line of revolution is substantially entirely removed with the result that said two optical surfaces will substantially merge with each other at one point along the line of the cliff-like wall.

6. The process of forming a semi-finished blank for a multifocal lens comprising forming a finished optical surface over a portion of the side surface of the blank to a radius of curvature which will control in part the resultant prescriptive power desired through said portion of the completed lens, securing said blank to a holder carried by a support pivoted about a center located at a distance from said blank substantially equal to the radius of curvature of a second surface which is to be formed over a portion of the blank adjacent to the first formed surface, pivotally supporting a tool about an axis which intersects the axis of the pivot of the work holder support, angling said tool about its pivot to dispose the tool for engagement with the blank throughout the width of the area of said blank on which said second surface is to be formed, rotating said tool and oscillating the blank about the center of the pivot of the support carrying the holder and blank to abrade said second surface and cause the curvature generated thereon to be of a radius equal to the distance between the surface of the tool and the center about which the blank is oscillated and to simultaneously cause a cliff-like edge to be formed between said surfaces and controlling the depth to which said second surface is formed so as to cause said surface to substantially blend with said first surface at a given point along said cliff-like edge.

7. The process of forming a multifocal lens comprising forming a finished optical surface over a portion of the side surface of the blank to a radius of curvature which will control in part the resultant prescriptive power desired through said portion of the completed lens, securing said blank to a holder carried by a support pivoted about a center located at a distance from said blank substantially equal to the radius of curvature of a second surface which is to be formed over a portion of the blank adjacent to the first formed surface, pivotally supporting a tool about an axis which intersects the axis of the pivot of the work holder support, angling said tool about its pivot to dispose the tool for engagement with the blank throughout the width of the area of said blank on which said second surface is to be formed, rotating said tool and oscillating the blank about the center of the pivot of the support carrying the holder and blank to abrade said second surface and cause the curvature generated thereon to be of a radius equal to the distance between the surface of the tool and the center about which the blank is oscillated and to simultaneously cause a cliff-like edge to be formed between said surfaces and controlling the depth to which said second surface is formed so as to cause said surface to substantially blend with said first surface at a given point along said cliff-like edge, and forming a finished optical surface on the opposed side of said blank of a curvature to introduce the prescriptive powers desired through the respective focal fields of the lens.

RALPH F. BARDWELL.
JOHN H. SMITH.